United States Patent
Meese

(10) Patent No.: US 9,528,541 B2
(45) Date of Patent: Dec. 27, 2016

(54) HOLDER FOR CASTING INTO A CONCRETE ELEMENT

(71) Applicant: MEESE GMBH, Bergisch Gladbach (DE)

(72) Inventor: Ludwig Meese, Bergisch Gladbach (DE)

(73) Assignee: MEESE GMBH, Bergisch Gladbach (DE)

( * ) Notice: Subject to any disclaimer, the term of this patent is extended or adjusted under 35 U.S.C. 154(b) by 214 days.

(21) Appl. No.: 14/351,081

(22) PCT Filed: Oct. 5, 2012

(86) PCT No.: PCT/EP2012/004177
§ 371 (c)(1),
(2) Date: Apr. 10, 2014

(87) PCT Pub. No.: WO2013/053452
PCT Pub. Date: Apr. 18, 2013

(65) Prior Publication Data
US 2014/0286726 A1  Sep. 25, 2014

(30) Foreign Application Priority Data

Oct. 12, 2011  (DE) .................. 10 2011 115 715

(51) Int. Cl.
*F16B 39/02* (2006.01)
*F16B 19/00* (2006.01)
(Continued)

(52) U.S. Cl.
CPC ................ *F16B 19/00* (2013.01); *E04B 1/41* (2013.01); *E21D 11/086* (2016.01); *E21D 11/10* (2013.01);
(Continued)

(58) Field of Classification Search
CPC ...... F16B 19/00; E21D 11/086; E21D 11/383; E21D 11/10; E04B 1/41
(Continued)

(56) References Cited

U.S. PATENT DOCUMENTS 2,135,118 A * 11/1938 Stewart ................. E04F 13/088
29/453
3,158,964 A * 12/1964 Haas ..................... E04B 1/2612
24/704.1
(Continued)

FOREIGN PATENT DOCUMENTS

DE      3931369 A1     12/1990
DE      19847360       3/2000
(Continued)

OTHER PUBLICATIONS

International Search Report for PCT/EP2012/004177, English Translation attached to original, Both completed by the European Patent Office on Feb. 13, 2014, All together 5 Pages.

*Primary Examiner* — Gary Estremsky
(74) *Attorney, Agent, or Firm* — Brooks Kushman P.C.

(57) ABSTRACT

A holder in particular for fastening a lining, for at least partially casting into a concrete element which is cast using a formwork, wherein the holder is aligned by an outer surface with the surface of the concrete element pointing towards the formwork, in particular for use in tunnel-building and engineering construction. The holder for casting into a concrete element is made available which can be handled simply for preparation purposes and during the concreting operation and using which a lining can be fastened simply to the concrete element. This is achieved in that a fastening device for releasably fastening the holder to the formwork is provided, wherein the fastening device has a holding part interacting with the formwork and a clamping (Continued)

Figure 1:
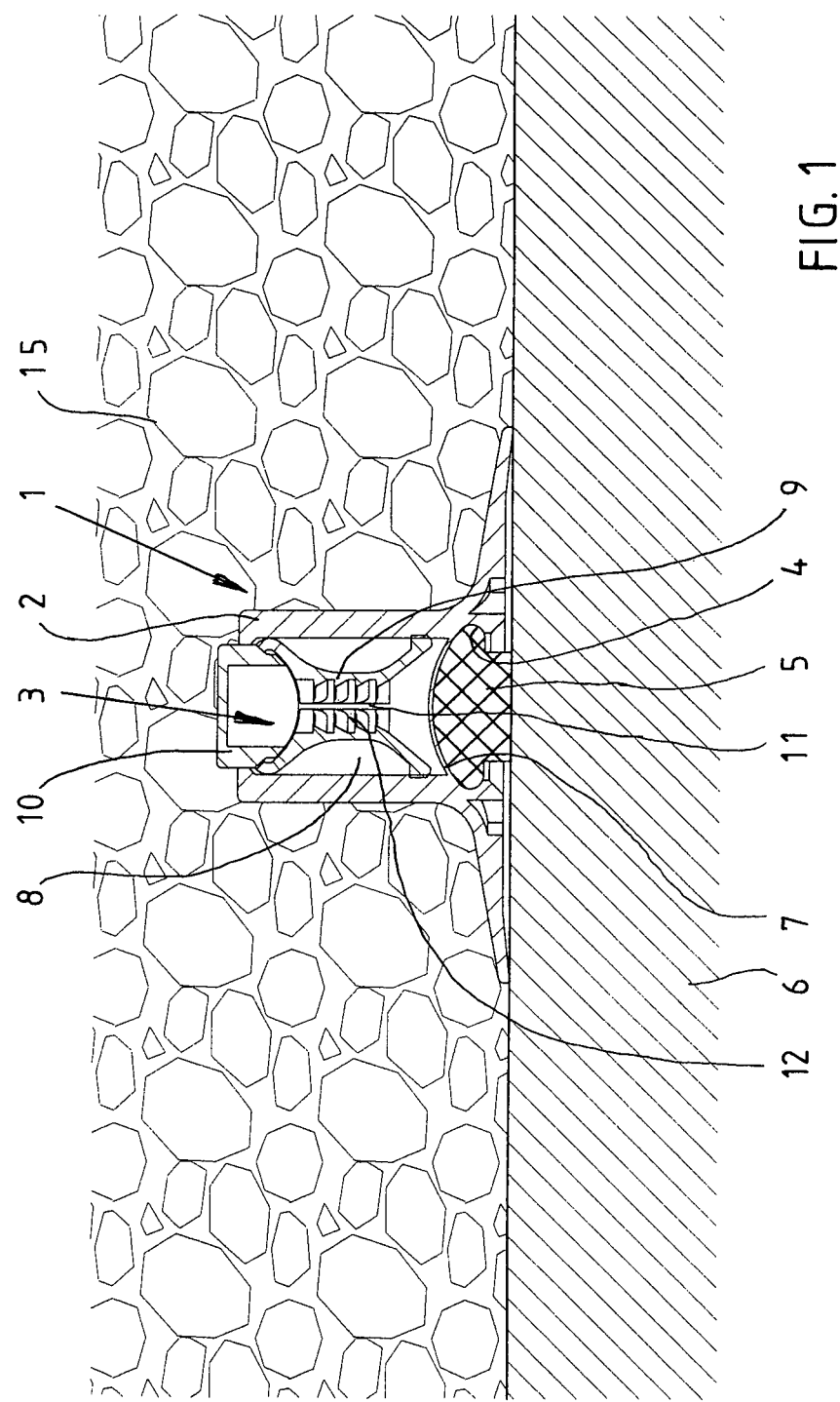

element arranged on the outer surface of the holder, wherein the clamping element interacts with the holding part.

10 Claims, 7 Drawing Sheets

(51) Int. Cl.
    *E21D 11/10*            (2006.01)
    *E21D 11/38*            (2006.01)
    *E04B 1/41*             (2006.01)

(52) U.S. Cl.
    CPC ............ *E21D 11/383* (2013.01); *E04B 1/4114* (2013.01); *Y10T 29/49948* (2015.01)

(58) Field of Classification Search
    USPC .................................. 411/82; 249/96; 52/704
    See application file for complete search history.

(56) References Cited

U.S. PATENT DOCUMENTS

| | | | | |
|---|---|---|---|---|
| 3,789,776 A | * | 2/1974 | Funkey | F16J 13/065 105/377.11 |
| 4,631,887 A | * | 12/1986 | Francovitch | E04D 5/143 24/459 |
| 4,717,301 A | * | 1/1988 | Oddenino | B60R 13/0206 411/360 |
| 4,726,561 A | * | 2/1988 | Worzala, Jr. | B28B 23/0056 249/219.1 |
| 5,104,273 A | * | 4/1992 | Clark | E04H 4/14 285/206 |
| 5,240,543 A | * | 8/1993 | Fetterhoff | F16B 5/01 156/293 |
| 6,109,587 A | * | 8/2000 | Peacock | B28B 23/0056 249/205 |
| 6,450,505 B1 | * | 9/2002 | Gavin | E03F 5/021 249/39 |
| 6,688,049 B2 | * | 2/2004 | Sanftleben | E04G 21/142 294/89 |
| 7,387,288 B2 | * | 6/2008 | Hull | F16L 25/0045 249/91 |
| 8,136,328 B2 | * | 3/2012 | Erickson | E04C 2/365 411/173 |
| 8,647,542 B2 | * | 2/2014 | Zakaras | E04C 5/161 249/83 |

FOREIGN PATENT DOCUMENTS

| | | |
|---|---|---|
| DE | 3931369 C2 | 9/2001 |
| DE | 20111550 | 1/2002 |
| DE | 102009003726 | 11/2010 |
| JP | 2001107446 | 4/2001 |
| JP | 2010261295 | 11/2010 |

\* cited by examiner

HOLDER FOR CASTING INTO A CONCRETE ELEMENT

CROSS-REFERENCE TO RELATED APPLICATION

This application is the U.S. national phase of PCT Application No. PCT/EP12/004177 filed on Oct. 5, 2012, which claims priority to German Patent Application No. 10 2011 115 715.1 filed on Oct. 12, 2011, the disclosures of which are incorporated in their entirety by reference herein.

The invention relates to a retaining arrangement, in particular for fastening a lining, for at least partially casting into a concrete element which is cast using a formwork, wherein the retaining arrangement has an outer surface aligned with that surface of the shrinkage element which is facing forward the formwork, in particular for use in tunneling and engineering. The invention also relates to a concrete element which is provided with such a retaining arrangement, and to a method of fastening various linings on the surface of such a concrete element.

Such a retaining arrangement is known from DE 39 31 369 C2. This retaining arrangement has a plug-in opening or a screw-in opening for a corresponding round cap. The retaining arrangement is positioned on a formwork in a manner which is not known and encased in concrete. Once the formwork has been removed, a round cap is fastened on the retaining arrangement and a lining is fastened on the round cap in a suitable manner, for example is welded thereto.

A further retaining arrangement is known from DE 198 47 360 C1. This retaining arrangement is designed in the form of a threaded sleeve which is cast into a concrete element in the region of a depression incorporated in the concrete element. A lining is then formed in the depression and a hole is made in the lining in the region of the threaded sleeve. Thereafter, a tie bolt is screwed into the threaded sleeve, through said hole, in order to fasten the lining on the concrete element. Finally, for reliable sealing, a round cap, welded or adhesively bonded to the lining, is fitted in the region of the tie bolt. The various operating steps of the lining-fastening method which can be realized using this fastening part involve high outlay and are susceptible to problems.

It is an object of the invention to supply a retaining arrangement which is intended for casting into a concrete element, is easy to handle at the preparation stage of, and during, the concreting operation and can be used to fasten a lining straightforwardly on the concrete element.

This object is achieved by the provision of a fastening device for fastening the retaining arrangement in a releasable manner on the formwork. Whereas the known prior art does not give any indication of how the corresponding retaining arrangements are positioned, and fastened, on the formwork, the retaining arrangement according to the invention provides a fastening device with which the retaining arrangement can be secured straightforwardly and reliably on the formwork at the preparation stage of the concreting operation. It is also the case that the retaining arrangement secured in this way is retained reliably on the formwork during the concreting operation, wherein, following the concreting operation, the formwork can be readily removed from the concrete element and the retaining arrangement, which is now cast into the concrete element. This results in a considerable reduction in the operational outlay and also subsequently in the installation outlay. For example it is possible for a plurality of retaining arrangements to be fastened on the formwork element, and cast therein, at predetermined intervals. This creates clearly defined fastening locations which can be located straightforwardly during the subsequent operation of fastening the cladding. The operation of fastening a lining on the concrete element is thus simplified overall.

In a development of the invention, the fastening device has a retaining part, which interacts with the formwork, and a clamping element, which is arranged on the outer surface of the retaining arrangement, wherein the clamping element interacts with the retaining part. The fastening device designed in this way is easy to handle.

In a further configuration of the invention, the clamping element is designed in the form of an undercut which is incorporated in the retaining body and by means of which the clamping element is clamped onto the retaining part fastened on the formwork. This fastening operation is straightforward to implement at the preparation stage of the concreting operation and the retaining body can easily be released from the formwork during the formwork-removal operation.

In a further configuration of the invention, the retaining part is a magnet which is positioned, preferably together with the retaining body, on the formwork, which is produced from an iron material. During the formwork-removal operation, the retaining body is then released from the formwork together with the magnet, and the magnet can be removed from the retaining body for further use. If, in contrast, the magnet remains on the formwork during the formwork-removal operation, it can be removed from the formwork or else a new retaining body is fastened on the magnet for the next concreting operation.

In a development of the invention, the retaining part is a formwork protuberance, and the formwork protuberance can be fastened on the formwork by means of a retaining pin. A central opening is preferably made here in the formwork protuberance, and the retaining pin can be guided through this opening. The retaining pin, like the formwork protuberance as well, is produced preferably from a metallic material and, for example in the case of a formwork produced from wood, can be driven straightforwardly into the same. It is also conceivable, however, for the retaining pin produced from a metallic material to be driven into a formwork produced from metal. It is also possible, within the context of the invention, for the retaining pin to be formed in one piece with the formwork protuberance, wherein the structural unit prefabricated in this way is then installed on the formwork.

A further embodiment of the invention provides for the formwork protuberance to be adhesively bonded or welded to the formwork. An adhesively bonded formwork protuberance can be released from the formwork again for repositioning purposes, whereas a formwork protuberance produced from a metallic material and welded to a formwork which is likewise produced from a metallic material remains on the formwork preferably on a permanent basis. In the case of a new formwork operation, a new retaining arrangement is then plugged onto the formwork protuberance. When not in use, the retaining protuberance can be covered by a cap so as not to be contaminated by concrete. If it is not covered when not in use, any adhering concrete can be straightforwardly removed, for example, using a high-pressure cleaner. If the formwork protuberance is no longer required, it can be removed from the formwork using a severing tool.

In a development of the invention, the retaining part may be designed in the form of a piston which is inserted in a movable manner in a cylinder incorporated in the formwork. Should a retaining arrangement be fastened on the piston, which is otherwise designed like a formwork protuberance, the piston is extended, for example hydraulically or pneumatically, out of the formwork to the extent where the clamping element of the retaining arrangement can be fastened on the piston. When not in use, the piston can then be retracted all the way into the cylinder in the formwork in order to form a smooth formwork surface.

In an alternative embodiment, the fastening device is a suction cup which interacts with the retaining arrangement. The retaining arrangement here is preferably designed such that it forms the suction cup at the same time. For example it is possible for the retaining arrangement to be produced from a rubber-like material and thus to be fastened straightforwardly on the clean surface of the formwork.

In a development of the invention, the retaining arrangement has a mushroom-shaped basic body and a hollow clamping body, which interacts with the basic body. This at least two-part construction of the retaining arrangement renders straightforward production possible. The basic body and the hollow clamping body here are preferably produced from a plastics material using injection molding.

In a further configuration of the invention, the hollow clamping body is designed in the form of a carrier, which forms a cavity and has at least one clamping bracket, preferably two clamping brackets, arranged in the cavity of the carrier. The carrier is, for example, of cylindrical or rectangular design and is inserted into a corresponding recess or into the interior of the basic body. The carrier is produced, together with the clamping brackets, as a single component, for example using plastics injection molding. For easier production capability, it is possible for the carrier to be covered, on the concrete-facing outer side, by a separately produced covering cap, wherein the covering cap prevents concrete from penetrating into the cavity or into the interior.

In another embodiment, preferably two clamping brackets are formed in one piece with a base plate of the hollow clamping body and the clamping brackets can be pivoted in relation to the base plate. The hollow clamping body produced in this way can be installed in a straightforward manner by the clamping brackets being pivoted to form the cavity of the hollow clamping body and then by the hollow clamping body formed in this way subsequently being inserted, at least in part, into a, for example, rectangular or cylindrical recess or into the interior of the mushroom-shaped basic body. It is possible here for the hollow clamping body and the basic body to be adhesively bonded or clamped to one another in addition. The base plate projects laterally beyond the cylindrical recess and thus ensures a firm hold in the concrete.

In a development of the invention, following the formwork-removal operation, a holder can be inserted into the cavity through the outer surface. In a further configuration, the holder is an anchor which interacts with a round cap. The anchor may be produced in one piece with the round cap for example from a plastics material. The outer surface has an outer region forming the clamping element and an inner region forming a formwork-facing covering of the cavity. The anchor is driven through the inner region of the outer surface and introduced into the cavity for clamping to the clamping brackets.

In a further configuration of the invention, a concrete element is provided for use in tunneling or engineering, wherein the concrete element is cast using at least one formwork, wherein a retaining arrangement as claimed in one of the preceding claims is fastened in a releasable manner on the formwork element prior to the concreting operation.

A method of fastening a lining on the surface of a concrete element provides the following steps:
a) supplying a concrete element with a retaining arrangement which is concreted into the concrete element in a surface-flush manner at at least one fastening location,
b) fastening a round cap on the retaining arrangement by means of a holder,
c) fastening the lining on the round cap.

It is possible here for the lining to be adhesively bonded or welded to the round cap in a conventional manner. It is preferable, however, for the round cap to be provided with a claw-type fastening which, during the operation of fastening the lining on the round cap, penetrates into a nonwoven layer applied to that side of the lining which is facing the concrete element. The round cap here is of multi-part design with at least one base part and a cover, such that, during an operation of pressing the lining onto the round cap, claws extend, with position-altering action, through recesses in the cover of the round cap and penetrate into the nonwoven layer. In order to prevent the connection from releasing, it is provided that the cover and the base part are locked to one another in the pressed-on end position.

In a further configuration, the components (retaining arrangement with basic body and hollow clamping body, round cap and retaining part) are produced from a plastics material, for example PVC, ABS, PE, VLDPE, TPO, FPO, polyamide or polycarbonate. ABS in particular is impact-resistant and, in addition, lends itself well to processing.

Of course, it is also possible for the components, in particular, the claws, to be produced from metallic material such as steel or aluminum.

Further advantageous configurations of the invention can be gathered from the description of the drawings, which describes in more detail the exemplary embodiments of the invention illustrated in the figures.

Figure 2:
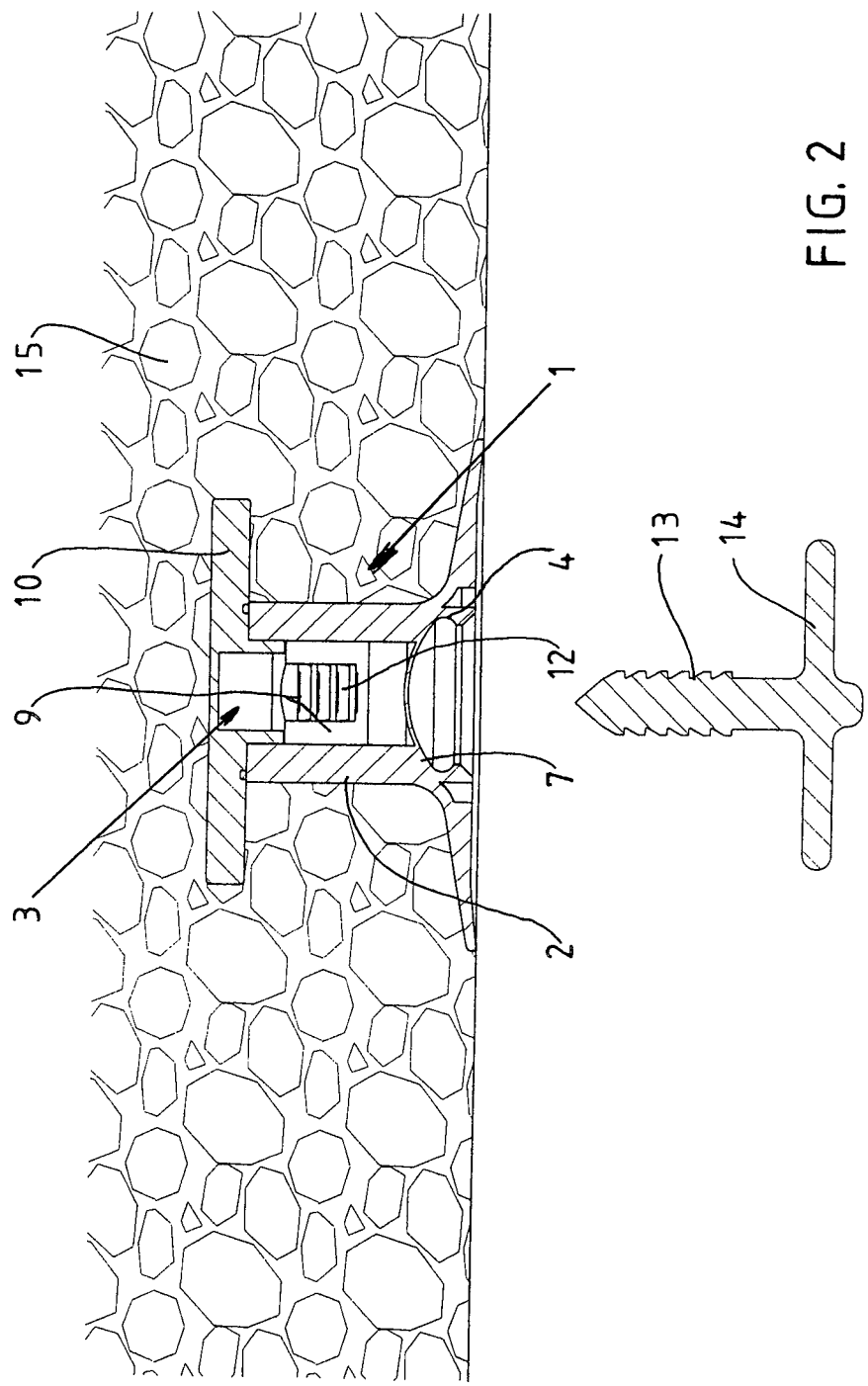
Figure 3:
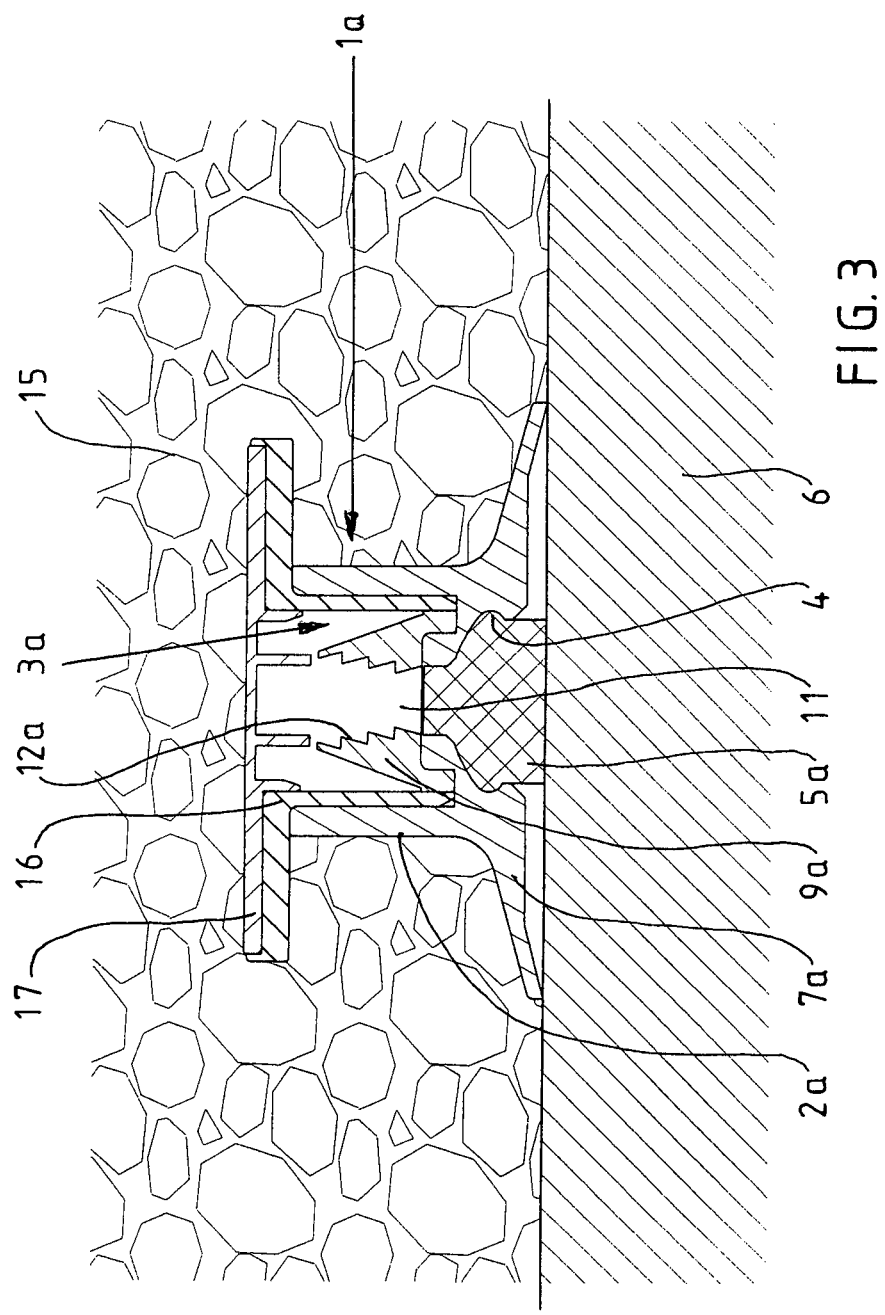
Figure 4:
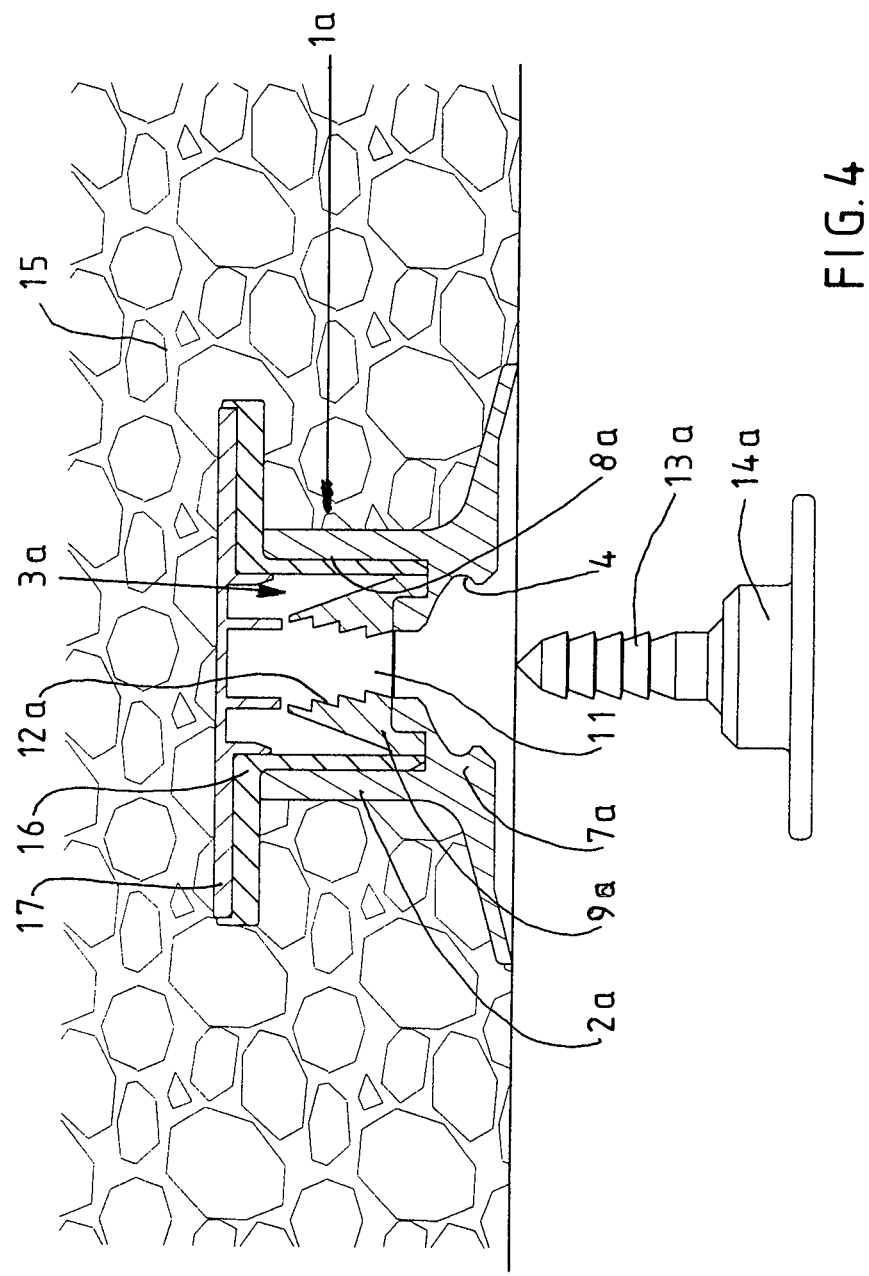
Figure 5:
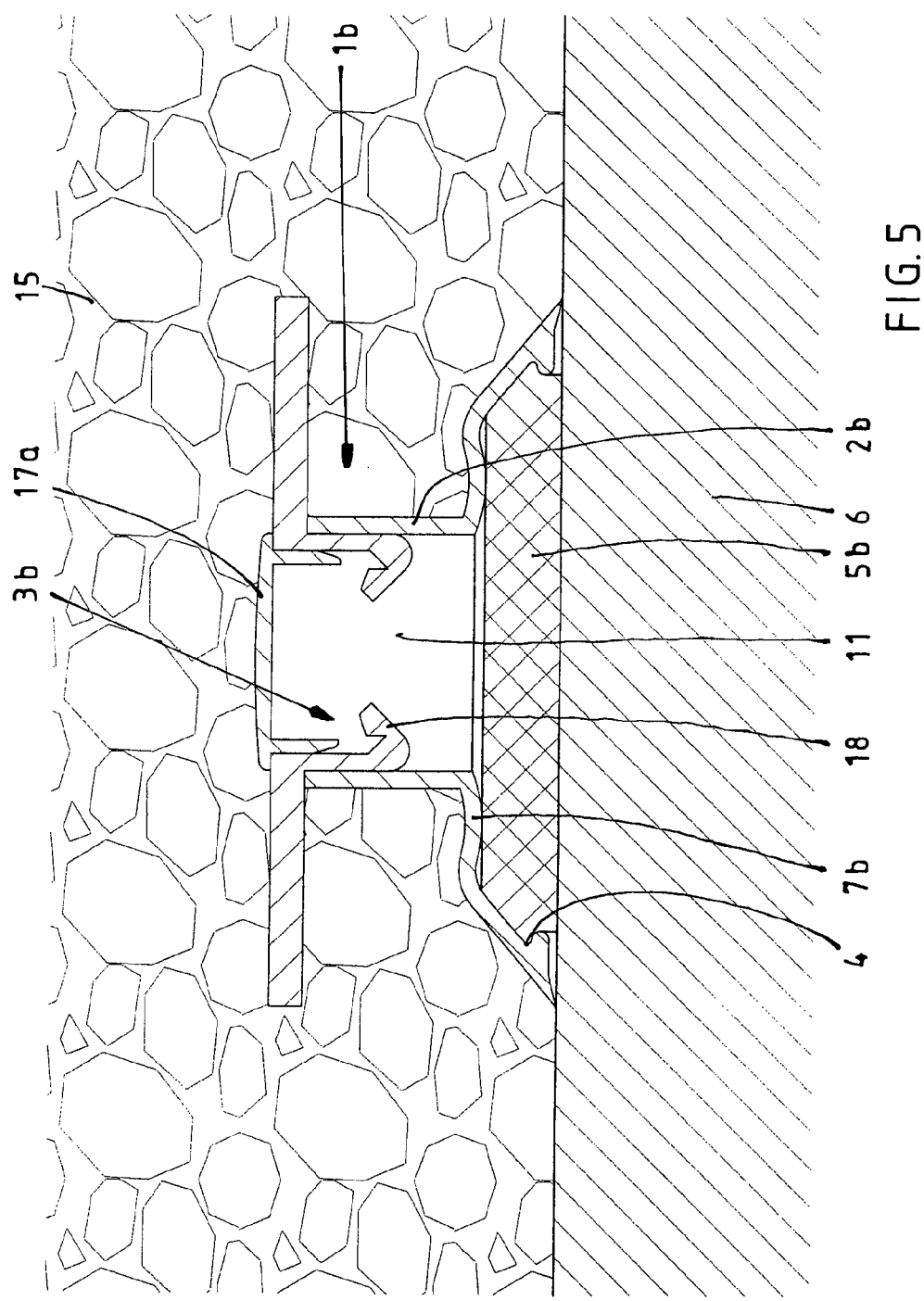
Figure 6:
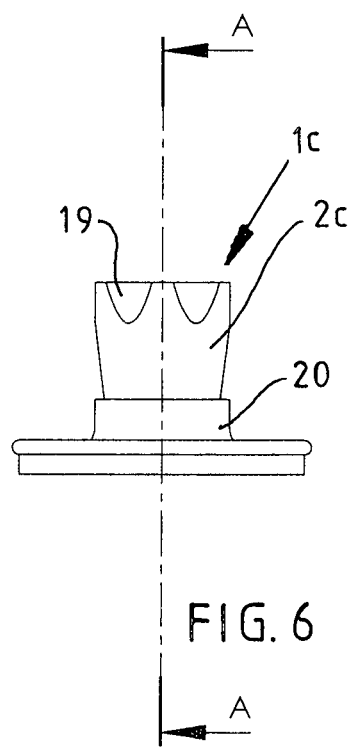
Figure 6A:
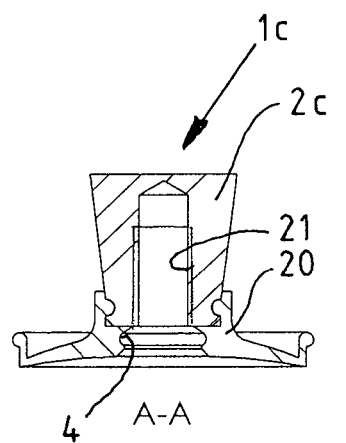
Figure 6B:
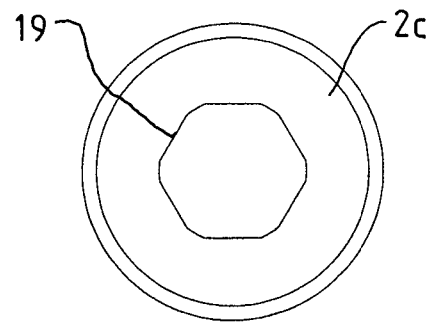
Figure 6C:
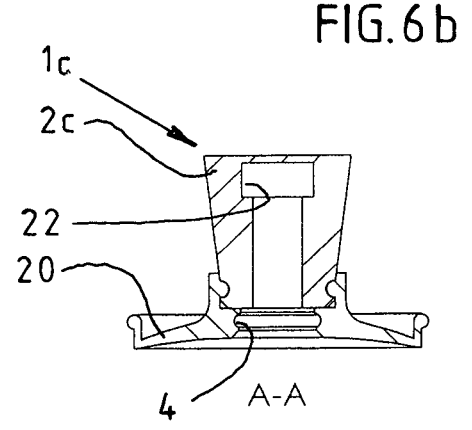
Figure 7:
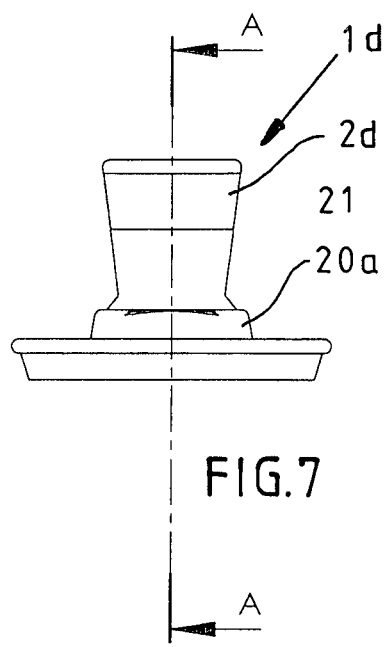
Figure 7A:
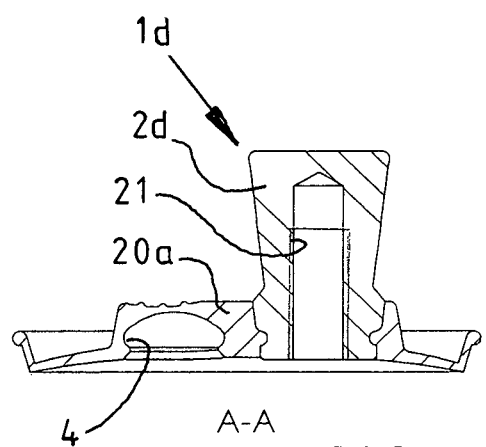
Figure 7B:
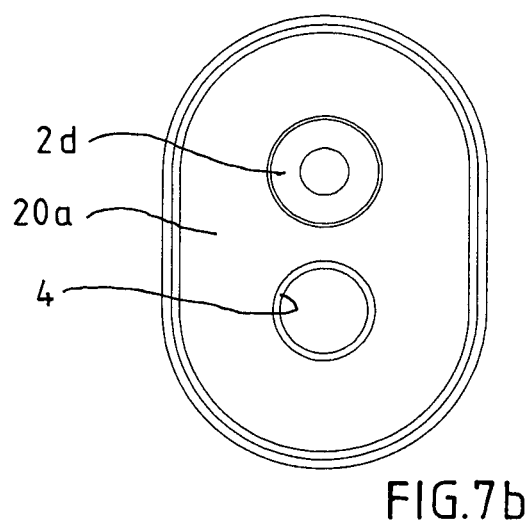

In the drawings:

FIG. 1 shows a cross section through a retaining arrangement according to the invention which is cast into concrete and is fastened on a formwork, FIG. 2 shows a further cross section through a retaining arrangement according to FIG. 1, which is cast into concrete and has an anchor for insertion into a cavity of the retaining arrangement, FIG. 3 shows a cross section through a second exemplary embodiment of a retaining arrangement which is cast into concrete and is fastened on a formwork, FIG. 4 shows a cross section according to FIG. 3, with the formwork removed and with an anchor for insertion into a cavity of the retaining arrangement, FIG. 5 shows a cross section through a third exemplary embodiment of a retaining arrangement which is cast into concrete and is fastened on a formwork, FIG. 6 shows a side view of a further exemplary embodiment of a retaining arrangement, FIG. 6a shows a sectional illustration of FIG. 6, FIG. 6b shows a plan view of FIG. 6, FIG. 6c shows a sectional illustration of an exemplary embodiment of a retaining arrangement which has been modified in relation to FIG. 6a, FIG. 7 shows a side view of a further exemplary embodiment of a retaining arrangement, FIG. 7a shows a sectional illustration of FIG. 7 and FIG. 7b shows a plan view of FIG. 7.

FIG. 1 illustrates a first cross section of a retaining arrangement 1 configured according to a first embodiment. The retaining arrangement 1 has a mushroom-shaped basic body 2 and a hollow clamping body 3, which interacts with the basic body 2. The retaining arrangement 1 is fastened on a formwork protuberance 5 via a clamping element designed in the form of an undercut 4, wherein the formwork protuberance 5 is fastened on, in particular welded to, a formwork 6. The formwork protuberance 5 and the clamping element designed in the form of an undercut 4 form a fastening device for fastening the retaining arrangement 1 on the formwork 6. The retaining arrangement 1 has an outer surface 7 which is aligned with the formwork 6 and has an outer region forming the clamping element and an inner region forming a formwork-facing covering of an interior 8 of the retaining arrangement 1. The hollow clamping body 3 is inserted into the interior 8, said hollow clamping body comprising a base plate 10 and two clamping brackets 9, which are produced in one piece with a base plate 10, for example in the form of a plastics injection molding. In the installed state illustrated, the clamping brackets 9 have been pivoted in relation to the base plate 10 to form a cavity 11, said clamping brackets being produced in a swung-up state (not illustrated). The clamping brackets 9 have barbs 12, which interact with the corresponding profiling 13 of a holder (FIG. 2) designed in the form of an anchor 14, when the anchor 14 is introduced or pushed into the cavity 11 by way of the shank part which bears the profiling 13. The anchor 14 here pierces the inner region of the outer surface 7 by way of the tip of the shank part and, as the pushing-in movement continues, is introduced into the cavity 11 in order for the profiling 13 to be clamped to the barbs 12.

The formwork 6 is configured, for example, in the form of tunneling segments produced from a metal material, in particular iron. Once the retaining arrangement 1 has been fastened on the formwork 6 by means of the undercut 5, which is clamped on the formwork protuberance 4, it is possible for the formwork 6 to be positioned, for example, in a gallery and for the concrete to be introduced between the gallery surface and the formwork 6 in order to form a concrete element 15.

Once the formwork 6 has been removed, the anchor 14 (FIG. 2) is used to fasten a round cap on the retaining arrangement 1 cast into the concrete element 15. Of course, depending on the size and configuration of the formwork 6, it is possible for any desired number of retaining arrangements 1, according to the invention, to be fastened on the formwork 6 and then cast into the concrete element 15. A lining, for example in the form of a sheet material, is fastened on the round cap, or the round caps, in particular for sealing purposes. This fastening operation can take place in any desired manner. For example it is possible for the sheet material to be adhesively bonded to the round cap using a suitable adhesive, wherein the adhesive is applied to the round cap or an adhesive pad is attached to the round cap. It is also possible for the sheet material, provided with a nonwoven layer, to be fastened by means of a hook-and-loop fastener which has been fastened on the round cap or applied thereto in some other manner (extrusion Velcro). It is also possible, however, for the round cap to be provided with a claw-type fastening device, in which case, during the operation of fastening the lining, the claws then penetrate into a nonwoven layer of the sheet material, which has been laminated with such a nonwoven layer. The round cap here has a base plate, with which a cover interacts. The cover has a defined extent of its outer periphery positioned on the outer circumference of the base plate. This basic position is secured temporarily, for example, by one (encircling) or more groove/tongue connection(s). In the interior formed by the base plate and the cover, the claws are retained in defined positions by the appropriate configuration of those surfaces of the base plate and of the cover which are facing the interior. In the basic position, the claws, each having grippers and a pivoting mechanism, are arranged virtually entirely within the interior, whereas, in the retaining position, the claws have their grippers projecting, at least to a large extent, out of the cover, while the pivoting mechanism remains entirely in the interior. The pivoting mechanism interacts with the corresponding surfaces of the base plate and of the cover such that, during the operation of pressing the cover onto the base plate, the pivoting mechanism pivots the grippers, which extend here through openings in the form of slots in the cover. As a result, the claws, or the grippers thereof, penetrate reliably into the nonwoven layer without the latter being displaced in any way. In the retaining position, they are engaged in the nonwoven layer such that it is no longer possible for the nonwoven layer to be released even under, for example, tensile loading. In the retaining position, the cover is secured to or locked with the base plate on a permanent basis (in contrast to the basic position) by means of, for example, a groove/tongue connection.

FIG. 2 shows a cross section through the retaining arrangement 1 according to FIG. 1 which is cast into concrete and has the anchor 14 arranged beneath it for insertion into the cavity 11 of the retaining arrangement 1, this cross section being rotated by 90°. In contrast to the illustration of FIG. 1, it can be seen here that the base plate 10 of the hollow clamping body 3 has two arms extending laterally beyond the basic body 2 and is thus anchored in the concrete element 15 in a state in which it is encased by concrete. Since the clamping brackets 9, in the formwork-facing end region, have been bent up in relation to the interior 8 of the basic body 2 and, in addition, can engage in a groove of the basic body 2, this ensures solid, non-separable interaction of the hollow clamping body 3 and of the basic body 2 in the concrete element 15.

FIG. 3 shows a cross section through a second exemplary embodiment of a retaining arrangement 1a which is cast into a concrete element and is fastened on the formwork 6. In the case of this exemplary embodiment, the formwork protuberance 5a is designed to be somewhat higher than in the first exemplary embodiment. In particular, however, the hollow clamping body 3a has a carrier 16, two clamping brackets 9a being incorporated in the carrier 16. The clamping brackets 9a are formed, as illustrated, in the manner of a cable tie element with barbs 12a, and the clamping brackets 9a are produced in one piece with the carrier 16. The carrier 16 is, for example, of cylindrical or rectangular design and is inserted into the interior 8a of the basic body 2a and secured in the basic body 2a, possibly in addition, by a groove/tongue connection. The carrier 16 is produced, together with the clamping brackets 9a, as a single component, for example using plastics injection molding. For easier production capability, the carrier 16 is covered, on the concrete-facing outer side, by a separately produced covering cap 17, wherein the covering cap 17 prevents concrete from penetrating into the cavity 11a.

FIG. 4 shows the same cross section through the retaining arrangement 1a according to FIG. 3, albeit with the formwork 6 removed and with an anchor 14a which is arranged beneath the retaining arrangement 1a and has a profiling 13a for insertion into the cavity 12a of the retaining arrangement 1a.

FIG. 5 shows a cross section through a third exemplary embodiment of a retaining arrangement 1b which is cast into concrete and is fastened on a formwork 6. In the case of this exemplary embodiment, the formwork protuberance 5b is designed to be flat and the outer surface 7b of the basic body 2b is adapted correspondingly. The hollow clamping body 3b is formed in the manner illustrated and has an annular shoulder 18, the profiling of an anchor clamping itself thereon. In particular in the case of this exemplary embodiment, it is also possible for the anchor to have a spring-deflection undercut which secures itself on the annular shoulder 18 once the anchor has been pushed in. Here too, the cavity 11 of the hollow clamping body 9b is covered by a covering cap 17a on the side of the concrete element 15.

FIG. 6 shows a further exemplary embodiment of a retaining arrangement 1c. In the case of this exemplary embodiment, the basic body 2c is produced, for example, from a metallic material and is connected to a foot part 20, which constitutes the clamping element having the undercut 4, and by way of which the basic body 2c is fastened on a formwork protuberance 5, 5a, 5b (not illustrated here). The foot part 20 is produced from an elastic material, for example rubber or also from an elastic plastics material, and is fixed to the basic body 2c. The basic body 2c is designed in the form of part of a cone and has end flattened portions 19, which ensures that, in the event of the retaining arrangement 1c cast into concrete being subjected to a rotary movement, said retaining arrangement 1c is retained in captive fashion in the concrete.

According to the sectional illustration of FIG. 6a, the basic body 2c has a recess, for example in the form of a bore, in which a thread 21 is made. Instead of an anchor 14, 14a a screw, forming a holder, can be screwed into said thread 21 and can be used to fasten, for example, a round cap or some other carrier component on the retaining arrangement 1c.

FIG. 6b shows a plan view of the retaining arrangement 1c, the flattened portions 19 at one end being clearly visible.

The exemplary embodiment according to FIG. 6d is modified slightly in relation to the exemplary embodiment which is illustrated in FIGS. 6 to 6c in that, here, the recess incorporated in the basic body 2c is provided with an end cylinder portion 22 which has a larger diameter than the rest of the recess. An anchor 14, 14a, which is retained in the cylinder portion 22 at one end, can be inserted into said recess.

The exemplary embodiment of a retaining arrangement 1d, which is illustrated in FIGS. 7 to 7b, differs from the exemplary embodiments illustrated in FIGS. 6 to 6c in that, here, the foot part 20a is of oval design and the undercut 4 is arranged laterally alongside the basic body 2d. It is also the case in this exemplary embodiment that the foot part 20a is produced from an elastic material, for example rubber or also from an elastic plastics material, and is fixed to the basic body 2d. In the case of this embodiment, the basic body 2d is designed to extend as far as the formwork (not illustrated here), in which case, following the concreting operation, said basic body 2d extends as far as the surface of the concrete. This basic body 2d is also provided with a thread 21, into which a holder in the form of a screw can be screwed. During the casting operation, the threaded opening can be covered with, for example, a protective sheet material.

To conclude, it should be pointed out that any desired combinations of the exemplary embodiments illustrated and described can be realized within the framework of the invention.

LIST OF DESIGNATIONS 1, 1a, 1b, 1c, 1d Retaining arrangement
2, 2a, 2b, 2c, 2d Basic body
3, 3a, 3b Hollow clamping body
4 Undercut
5, 5a, 5b Formwork protuberance
6 Formwork
7, 7a, 7b Outer surface
8, 8a Interior
9, 9a Clamping bracket
10 Base plate
11 Cavity
12, 12a Barb
13, 13a Profiling
14, 14a Anchor
15 Concrete element
16 Carrier
17, 17a Covering cap
18 Shoulder
19 Flattened portion
20, 20a Foot part
21 Thread
22 Cylinder portion

The invention claimed is:

1. A retaining arrangement to be at least partially cast into a concrete element that is cast using a formwork, comprising:
a body having an outer surface alignable with an outer surface of a concrete element to be formed which is facing toward a formwork; and
a fastening device fastening the body in a releasable manner on the formwork;
wherein the body comprises:
a mushroom-shaped basic body and a hollow clamping body, which interacts with the basic body; and
at least two clamping brackets formed in one piece with a base plate of the hollow clamping body, the clamping brackets being pivotable in relation to the base plate.

2. The retaining arrangement as claimed in claim 1, wherein the fastening device has a retaining part, which interacts with the formwork, and a clamping element, which is arranged on the outer surface of the body, wherein the clamping element interacts with the retaining part.

3. The retaining arrangement as claimed in claim 2, wherein the clamping element is designed in the form of an undercut which is incorporated in the body.

4. The retaining arrangement as claimed in claim 2, wherein the retaining part is a formwork protuberance and in that the formwork protuberance can be fastened on the formwork by means of a retaining pin.

5. The retaining arrangement as claimed in claim 2, wherein the retaining part is a formwork protuberance and in that the formwork protuberance can be welded to the formwork.

6. The retaining arrangement as claimed in claim 1, wherein the hollow clamping body has a carrier, which forms a cavity and has at least one clamping bracket arranged in the cavity.

7. The retaining arrangement as claimed in claim 1, wherein the clamping brackets can be pivoted in order to form the cavity of the hollow clamping body, and in that the hollow clamping body formed in this way can be inserted, at least in part, into a cylindrical recess of the mushroom-shaped basic body.

8. The retaining arrangement as claimed in claim 1, wherein a holder can be inserted into a cavity through the outer surface.

9. The retaining arrangement as claimed in claim 8, wherein the holder is an anchor which interacts with a round cap.

10. A concrete element for use in tunneling or engineering, wherein the concrete element is cast using at least one formwork, wherein a body as claimed in claim 1, is fastened in a releasable manner on the formwork prior to the concreting operation.

* * * * *